United States Patent
Yoshida

(10) Patent No.: US 7,522,387 B2
(45) Date of Patent: Apr. 21, 2009

(54) THIN FILM MAGNETIC HEAD AND FABRICATION PROCESS FOR PREVENTING SHORT-CIRCUIT FAILURE IN A NARROW TRACK WIDTH AND NARROW GAP LENGTH

(75) Inventor: Nobuo Yoshida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 497 days.

(21) Appl. No.: 11/183,037

(22) Filed: Jul. 15, 2005

(65) Prior Publication Data
US 2006/0012923 A1  Jan. 19, 2006

(30) Foreign Application Priority Data
Jul. 15, 2004 (JP) .............................. 2004-209135

(51) Int. Cl.
*G11B 5/39* (2006.01)
*G11B 5/11* (2006.01)

(52) U.S. Cl. ........................ 360/320; 360/319
(58) Field of Classification Search .................. 360/319, 360/320, 323, 324.2
See application file for complete search history.

(56) References Cited

U.S. PATENT DOCUMENTS

| 6,421,212 B1 * | 7/2002 | Gibbons et al. ......... 360/324.12 |
| 6,700,759 B1 * | 3/2004 | Knapp et al. ............. 360/324.2 |
| 2002/0097540 A1 * | 7/2002 | Hayashi et al. .......... 360/324.2 |
| 2004/0105194 A1 * | 6/2004 | Fontana et al. ......... 360/324.12 |
| 2004/0105195 A1 * | 6/2004 | Fontana et al. ......... 360/324.12 |
| 2005/0018365 A1 * | 1/2005 | Gill ........................ 360/324.2 |
| 2006/0092582 A1 * | 5/2006 | Gill et al. ............... 360/324.12 |

FOREIGN PATENT DOCUMENTS

| JP | 2002-280635 A | 9/2002 |
| JP | 2003-198000 A | 7/2003 |
| JP | 2003-298144 A | 10/2003 |

* cited by examiner

*Primary Examiner*—Craig A Renner
(74) *Attorney, Agent, or Firm*—Townsend and Townsend and Crew LLP; Rambod Nader

(57) ABSTRACT

Embodiments of the invention relate to preventing short-circuit failure even in the narrow track width and narrow gap length, resulting in improved yield. In one embodiment, die sensor heads are placed on both sides of the track direction of the sensor film. The sensor heads comprise the first insulating film with at least a part connected to the track direction wall surface of the sensor film and the third insulating film formed between the upper shield and the first insulating film, and have the relationship being Tw<Dx<Bx where the distance between edges of the first insulating film connected to the track direction wall surface of the sensor film is Tw, the distance between outside edges of the first insulating film along the track direction Bx, and the distance of inside edges of the third insulating film along the track direction Dx.

7 Claims, 12 Drawing Sheets

THIN FILM MAGNETIC HEAD AND FABRICATION PROCESS FOR PREVENTING SHORT-CIRCUIT FAILURE IN A NARROW TRACK WIDTH AND NARROW GAP LENGTH

CROSS-REFERENCES TO RELATED APPLICATIONS

This application claims priority from Japanese Patent Application No. JP2004-209135, filed Jul. 15, 2004, the entire disclosure of which is incorporated herein by reference.

BACKGROUND OF THE INVENTION

This invention relates to a thin film magnetic head which is applied to magnetic disc storage. More particularly, it relates to a thin film magnetic head used for reproducing.

With improving the high recording density of an HDD (Hard Disk Drive), a thin film magnetic head mounted in it requires even narrower track width, narrower gap length, and higher sensitivity. At present, a thin film magnetic head is used by combining a write head with a read head. A GMR head applying the GMR effect is mainly used for the read head. This GMR head is a CIP (Current In Plane) type head in which an electric signal flows parallel in the film surface of a sensor film. For further improvement of the recording density in the future, a TMR (Tunneling MagnetoResistive effect) head and a CPP-GMR (Current Perpendicular to a Plane-Giant MagnetoResistive effect) head have been actively developed, which are understood to have advantages of narrow track width and narrow gap length. This TMR head and CPP-GMR head are not CIP type heads in which an electric signal flows parallel in the film surface of a sensor film, but CPP type heads in which flow is perpendicular to the film surface, which is different from a conventional GMR head.

JP-A No. 280635/2002 disclosed that, for a TMR head, improvement of the barrier layer of a TMR sensor film improved the insulation, developer resistance, smoothness, and heat radiation. JP-A No. 198000/2003 disclosed that, for a CPP-GMR head, the alignment margin was improved by making the lower electrode connected to the sensor film in a convex shape and making the width of the upper electrode connected to the sensor film smaller than the lower electrode. JP-A No. 298144/2003 disclosed that planarizing the convex shaped part made it possible to form a more uniform sensor film, resulting in improved characteristics.

BRIEF SUMMARY OF THE INVENTION

In many CPP type heads, the upper and lower shields used as a magnetic shield are often used for the leads. Then, an insulating film is provided along the wall surface of the sensor film, and leads are provided on the top and bottom surfaces of the sensor film, whereby an electric current flows perpendicular to the film surface. In the case when an electric current flows perpendicular, if an unnecessary current path, that is, short-circuit develops between the upper and lower leads, this would become a fatal defect. Moreover, in the case when the isolation voltage between the upper and lower leads decreases, the event probability of short-circuit failure increases, resulting in a decrease in yield. With the narrowing of gap length in the future, there is a tendency for the distance between shields to become smaller. Because of this, it is thought that the possibility of short-circuit generation and of decreased isolation voltage increases more and more.

Furthermore, in the case when the distance between the upper and lower shields working as leads becomes smaller as the gap length becomes narrow, the capacitance between the upper and lower shields working as leads increases.

Capacitance has an important relationship not only with distance but also with the area of the leads, and the capacitance increases with an increase in the area of the leads. There is concern that the high frequency characteristics become worse when the capacitance increases. It is necessary to increase the signal frequency to improve recording density in the future. Therefore, improving the recording density is thought to be difficult due to worsening of the high frequency characteristics.

The content mentioned above will be described by way of example with reference to accompanying drawings. FIG. 2 is an explanatory drawing illustrating a conventional CPP type head. FIG. 2(a) is a drawing as seen from the air bearing surface (ABS), and FIG. 2(b) is a top plan projection drawing of FIG. 2(a).

In FIG. 2(a), the upper shield 11 and lower shield 1, which also work as the leads, are connected to each other through the CPP film 3 being a sensor film. The flow of signal current passes to the lower shield 1 from, for instance, the upper shield through the CPP film 3. If the current flows without passing through the CPP film 3, a decrease in output is caused by a shunt loss. Therefore, as shown in FIG. 2(a), the insulation performance between the upper shield 11 and the lower shield 1 is ensured by using the insulating film 2, insulating film 5, insulating film 8, and insulating film 10. Moreover, the insulating film 5 connected to the CPP film 3 keeps the insulation performance of the wall surface of the CPP film 3. The domain control film 6 (or sub-shield film) connected on the insulating film 5 has almost the same shape as the insulating film 5.

The pattern dimension of each film will be described. The inside distance of the insulating film 5 is controlled to be Tw. This Tw is also the width of the CPP film 3 and becomes the track width reading the reproduction signal field. In greater detail, the CPP film 3 consists of a multilayer film (not shown in the figure) and the width of the film, in which the magnetization rotates corresponding to the media magnetic field, is the track width in the multilayer film. The above-mentioned Tw is provided by the track forming pattern 41 prepared by using the track forming resist-pattern 4 described later. The width of the insulating film 2 is Ax, the distance between the edges of the insulating film 5 Bx, the distance of the insulating film 10 Dx, and the outer width of the track forming the pattern 41 Tx. The relationship of these pattern dimensions is a relationship being Tw<Ax<Bx<Dx<Tx.

Even more important is the relationship defined by Tw<Bx<Dx. The film thickness of the insulating film 2 decreases because it is also etched when the edges of the insulating film 5 are etched. That is, there is concern about deterioration of the insulation voltage at the part of region 80. After that, the film thickness is made thicker by the insulating layer 8, but it is easy for an etching step to remain. Insulator destruction easily occurs at this kind of step part because of electric field concentration. Moreover, in the case when the insulating film 2 is etched to the lower shield and the insulating film 2 is omitted, it is possible that the insulation voltage drops at the step part of the insulating film 8. Moreover, in the case when a metallic re-deposited layer is formed on the wall surface of the edges of the insulating film 5, a short-circuit occurs because the re-deposited layer is directly connected to the upper shield 11 and the lower shield 1. Briefly stated, there is a cause that the etching steps at the edges of the insulating film 5 are not protected by the insulating film 10. This has a relationship being Tw<Bx<Dx as mentioned above.

Next, the shape of each pattern is described in FIG. 2(b). As shown in the figure, the openings of the insulating film 2 (opening shape 21) and the insulating film 10 (opening shape 101) are formed greater than the CPP film 3 along both the track direction (horizontal direction in the figure) and the depth direction (vertical direction in the figure). The length of the depth direction of the opening of the insulating film 10 is assumed to be Dy. The track forming pattern 41 is placed at both edges of the CPP film 3. As mentioned above, Tw is provided by the track forming pattern 41. The length along the depth direction of the track forming pattern 41 is assumed to be Ty. The length of the depth direction of the CPP film 3 is provided by the stripe-height forming pattern 71, and the length of the depth direction of the stripe-height forming pattern 71 is assumed to be Cy. The insulating film 8 has the same shape as the stripe-height forming pattern 71. These pattern dimensions have a relationship being Cy<Ty<Dy.

As shown in FIG. 2(b), in the area which has no insulating film protection being the insulating film 2 and the insulating film 10, that is, the area 88 and area 83, the insulation voltage has to be maintained only by the insulating film 8. There is a possibility that the insulation yield deteriorates with increasing the area 88 and area 83. At the same time, there is a possibility that the high frequency characteristics become worse because the capacitance between the shields increases with increasing the area 88 and area 83. This is because it is impossible to enlarge the distance between the shields by the insulating film 2 and insulating film 10, resulting in the capacitance increasing. This is the part, area 85, in FIG. 2(a). Moreover, there are many parts in which the edges of the track forming pattern 41 and the edges of the stripe-height forming pattern 71 are not protected by insulating films, therefore, it is possible that a drop in the insulation voltage and short-circuits occur at these pattern edge areas 83.

In order to avoid this problem, it is thought to make the insulating film 2 thicker or bring the area protected by the insulating film 2 close to the CPP film 3. However, there is concern that the measurement accuracy becomes worse in the following processes. This is because the thickness distribution of the photoresist becomes worse and halation is generated by the effect of the steps and, thereby, there is concern that the measurement accuracy of the track forming pattern 41 and the stripe-height forming pattern 71 becomes worse. Therefore, it is thought that a narrow track width and narrow gap length are not compatible with improvements in insulation voltage yield and high frequency characteristics. It is understood that the problems mentioned above are created in the prior art CPP type head.

Additionally, the aforementioned JP-A No. 280635/2002 is about an improvement in the insulation barrier layer, and it does not describe the insulating characteristics around the sensor film. In JP-A No. 198000/2003 and JP-A No. 298144/2003, it is thought to be possible to make the insulating films thicker from the upper and lower lead structures to the inside of the sensor film, thereby improving the insulation voltage. However, there is concern that neighboring signals recorded on the magnetic recording media are read at the sensor film except for the part connected to the leads. Because of this, there is a possibility that an abnormal signal is generated, and improvement of the recording density becomes difficult.

Concerning the problems of the above-mentioned prior art, it is a feature of the present invention to provide a thin film magnetic head and the fabrication process thereof, in which yield can be improved by maintaining the insulation voltage between the upper and lower leads and preventing short-circuit failure in a narrow track width and a narrow gap length. Embodiments of the present invention provide a new pattern shape.

A thin film magnetic head according to one aspect of the present invention comprises a sensor film, a mechanism to flow a current along the film thickness direction of the sensor film, upper and lower shields, a first insulating film which is provided at both edges of the track direction of the sensor film on the side of the air bearing surface and at least one part connected to the track direction wall surface of the sensor film, and a third insulating film formed between the upper shield and the first insulating film. It has a relationship being Tw<Dx<Bx where Tw is the distance between the edges of the first insulating film connected to the track direction wall surface, Bx the distance between the outside edges of the first insulating film along the track direction, and Dx the distance between the inside edges of the third insulating film along the track direction.

A thin film magnetic head according to another aspect of the present invention comprises a sensor film, a mechanism to flow a current along the film thickness direction of the sensor film, upper and lower shields, a first insulating film which is provided at both edges of the track direction of the sensor film on the side of the air bearing surface and at least one part connected to the track direction wall surface of the sensor film, a second insulating film formed between the edge of the track direction of the first insulating film and the lower shield, and a third insulating film formed between the upper shield and the first insulating film. It has a relationship being Tw<Dx<Ax<Bx where Tw is the distance between the edges of the first insulating film connected to the track direction wall surface, Bx the distance between the outside edges of the first insulating film along the track direction, Ax the distance between the inside edges of the second insulating film along the track direction, and Dx the distance between the inside edges of the third insulating film along the track direction.

It may be possible to take a configuration having a magnetic film between the first insulating film and the third insulating film, and the magnetic film includes a hard magnetic film or a soft magnetic film. Even in this case, it has the relationship being Tw<Dx<Bx or Tw<Dx<Ax<Bx.

Although the shape of the air bearing surface is described above, the present invention also has a way of solving the problem of the direction leaving the air bearing surface, that is, the depth direction of the sensor.

A thin film magnetic head according to another aspect of the present invention comprises a pattern providing Tw, a pattern providing the length along the depth direction from the air bearing surface of the sensor film, and a pattern providing the length along the depth direction of the third insulating film from the air bearing surface. It has a relationship being Cy<Dy<Ty where Ty is the length of the pattern along the depth direction from the air bearing surface in the pattern providing Tw; Cy is the length along the depth direction at the pattern providing the length of the sensor film along the depth direction from the air bearing surface; and Dy is the length along the depth direction at the pattern providing the length of the third insulating film along the depth direction from the air bearing surface.

In a fabrication process of a thin film magnetic head according to another aspect of the present invention, a formation process of a read head comprises forming a lower shield, depositing a sensor film, processing the sensor film along the track direction, providing a length of the sensor film along the depth direction from the air bearing surface after processing the sensor film along the track direction, forming a third insulating film thereon, and forming an upper shield. Processing the sensor film along the track direction includes at least forming a first insulating film to protect the sensor film wall surface after etching the sensor film along the track direction. Providing a length of the sensor film along the depth direction from the air bearing surface includes forming a fourth insulating film while etching the sensor film in a length along the depth direction from the air bearing surface. Forming a third insulating film includes forming the third insulating film of interest using a pattern which is smaller than the distance between the outside edges of the aforementioned first insulating film along the track direction in the track direction and greater than the length of the aforementioned sensor film along the depth direction from the air bearing surface in the depth direction from the air bearing surface.

In the other fabrication process, a formation process of a read head comprises forming a lower shield, depositing a sensor film, providing a length of the sensor film along the depth direction from the air bearing surface, processing the sensor film along the track direction after providing the length of the sensor film along the depth direction from the air bearing surface, forming a third insulating film thereon, and forming an upper shield. Providing a length of the sensor film along the depth direction from the air bearing surface includes forming a fourth insulating film while etching the sensor film in a length along the depth direction from the air bearing surface. Processing the sensor film along the track direction includes at least forming a first insulating film to protect the sensor film wall surface after etching the sensor film along the track direction. Forming a third insulating film includes forming the third insulating film of interest using a pattern which is smaller than the distance between the outside edges of the aforementioned first insulating film along the track direction in the track direction and greater than the length of the sensor film along the air bearing surface direction in the depth direction from the air bearing surface.

According to the features described above, keeping the insulation voltage between the upper and lower leads and preventing the short-circuit failure become possible even in a narrow track width and narrow gap length, resulting in improved yield. Moreover, it also becomes possible to decrease the capacitance and improve the frequency characteristics by reducing the narrow gap area between the upper and lower leads. Furthermore, the recording density is increased by mounting a thin film magnetic head of the present invention, thereby, disk device with excellent frequency characteristics can be obtained with high yield.

According to the present invention, yield can be improved by keeping the insulation voltage between the upper and lower leads and preventing short-circuit failure even in a narrow track width and narrow gap length.

DETAILED DESCRIPTION OF THE INVENTION

Figure 1:
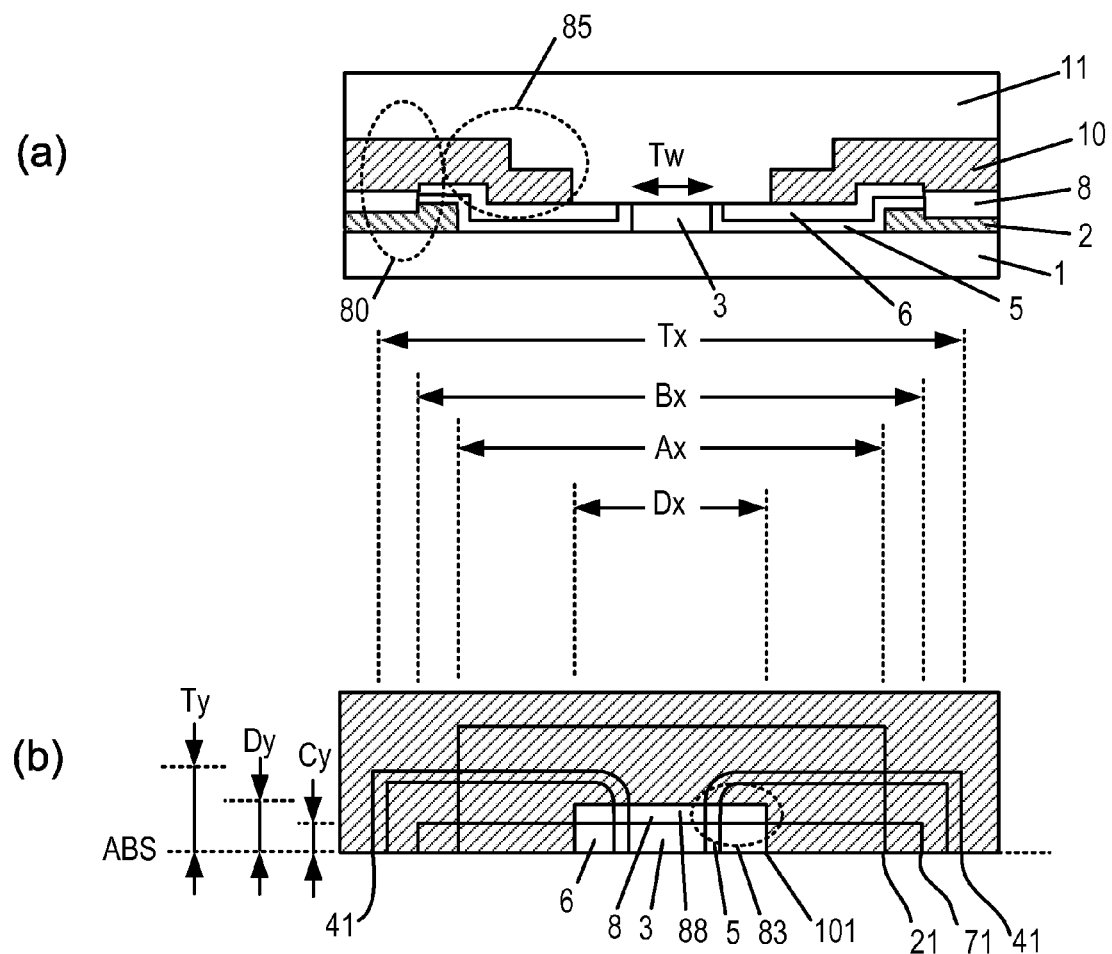
FIG. 1 is a schematic drawing illustrating an example of a thin film magnetic head of the present invention.

Hereafter, the embodiment of the present invention will be described referring to the drawing. A thin film magnetic head of the present invention is usually used for a read head and used in combination with a write head. If there is no special description in the following explanations, a write head part is omitted and only a read head part is described. Additionally, in each of the following figures, the same composition part will be shown using the same code.

FIG. 1 is a schematic drawing illustrating an example of a thin film magnetic head of the present invention. FIG. 1(a) is a drawing seen from the air bearing surface, and FIG. 1(b) is a plan projection drawing.

In FIG. 1(a), the upper shield 11 and lower shield 1, which are the leads, are connected to each other through the CPP film 3 being the sensor film. The signal current flows to the lower shield 1 from, for example, the upper shield 11 through the CPP film 3. Therefore, as shown in FIG. 1(a), the insulation of the upper shield 11 and the lower shield 1 is maintained by using the insulating film 2, insulating film 5, insulating film 8, and the insulating film 10. Moreover, the insulating film 5 connected to the CPP film 3 maintains the insulation of the wall surface of the CPP film 3. The domain control film 6 (or sub-shield film) connected on the insulating film 5 has almost the same shape as the insulating film 5.

Each pattern dimension will be described. The inside distance of the insulating film 5 is assumed to be Tw. This Tw is also the width of the CPP film 3 and the track width reading the reproduction signal field. In greater detail, the CPP film 3 consists of a multilayer film (not shown in the figure) and the width of the film, in which the magnetization rotates corresponding to the media magnetic field, is the track width in the multilayer film. The Tw is provided by the track forming pattern 41 prepared by using the track forming resist-pattern 4 described later. These points are the same as the prior art described in FIG. 2(a). The width of the insulating film 2 is Ax; the distance between the edges of the insulating film 5 Bx; the distance of the insulating film 10 Dx, and the outer width of the track forming pattern Tx. The relationship of these pattern dimensions is a relationship being Tw<Dx<Ax<Bx<Tx, and is different from the relationship of the prior art described in FIG. 2. Herein, even more important is realizing the relationship described by Tw<Dx<Bx. According to this relationship, it becomes possible that the insulating film 10 protects a part of the insulating film 2, in which the film thickness decreases, at the etching area 80 of the edges of the insulating film 5 and the etching step of the edge of the insulating film 5. Because of this, an improvement in the insulation voltage is possible, resulting in improved yield. Moreover, in the case when the insulating film 2 is omitted, this structure is useful because the insulating film 10 protects the etching step of the edge of the insulating film 5.

Next, the shape of each pattern is described in FIG. 1(*b*). As shown in FIG. 1(*b*), the openings of the insulating film 2 and the insulating film 10 are formed greater than the CPP film 3 along both the track direction (horizontal direction in the figure) and depth direction (vertical direction in the figure). The depth direction length of the opening of the insulating film 10 is assumed to be Dy. The track forming pattern 41 is placed at both edges of the CPP film 3. As mentioned above, Tw is provided by the track forming pattern 41. The length of the depth direction of the track forming pattern 41 is assumed to be Ty. The length of the depth direction of the CPP film 3 is provided by the stripe-height forming pattern 71, and the length of the depth direction of the stripe-height forming pattern 71 is assumed to be Cy. The insulating film 8 has the same shape as the stripe-height forming pattern 71. These points are similar to the aforementioned prior art. However, the important point is that the pattern dimensions of the present invention have the relationship Cy<Dy<Ty.

Figure 2:
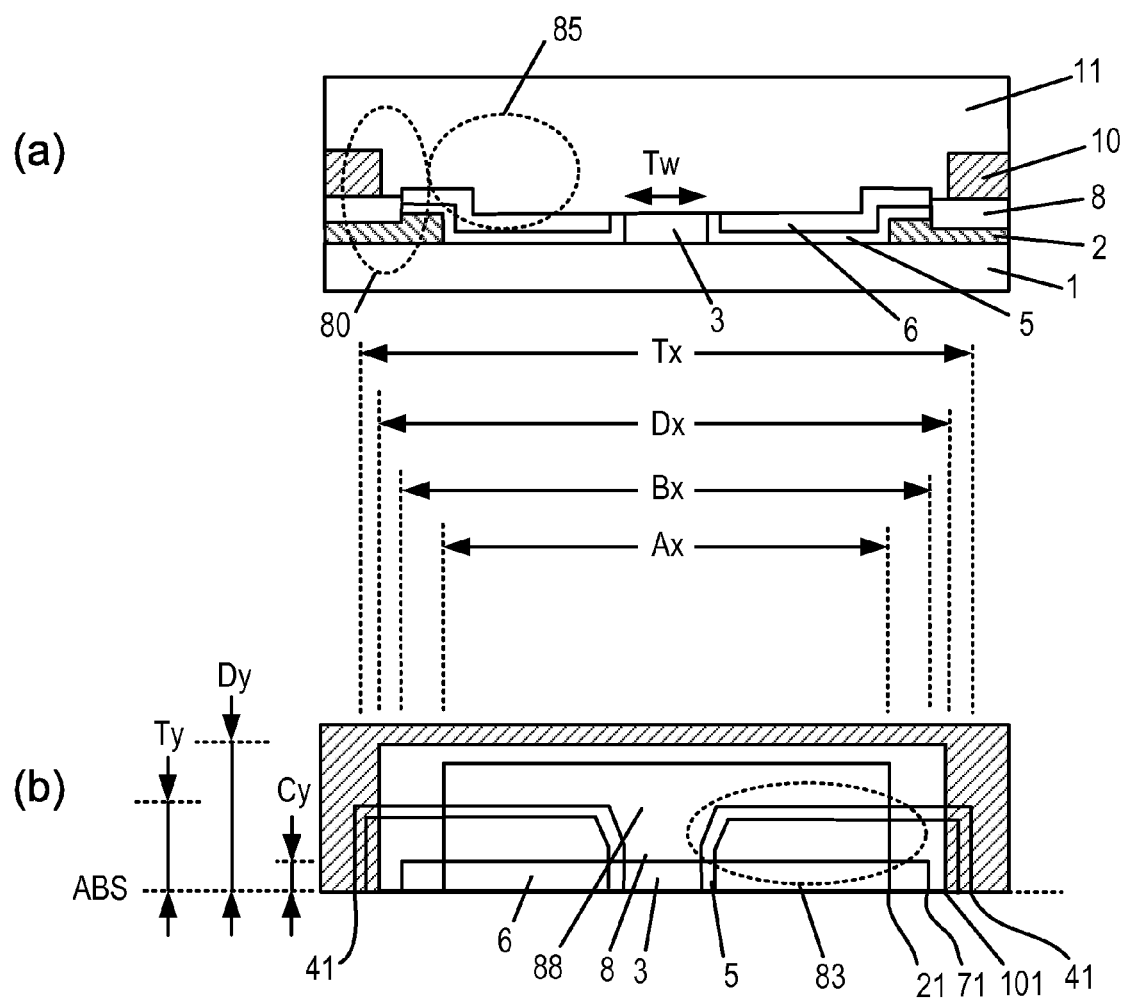
FIG. 2 is an explanatory drawing illustrating a conventional CPP type head.

As described in FIG. 1(*b*), the area having no insulating film protection of the insulating film 2 and insulating film 10, that is, the area 88 and the area 83, can be reduced by bringing the protection area of the insulating film 10 closer to the CPP film 3 than that in the prior art shown in FIG. 2(*b*). That is, a reduction of the area, in which the insulation voltage is maintained only by the insulating film 8, is possible. Because this area is reduced compared with FIG. 2(*b*) of the prior art, it is possible to improve the insulation yield. Since this area is reduced, the capacitance between the shields is decreased at the same time, whereby it is possible to improve the high frequency characteristics. Put another way, it is because the distance between the shields can be widened by the insulating film 10 at the area 85 in FIG. 1(*a*) as seen from the air bearing surface, whereby it is possible to reduce the capacitance.

It will become apparent upon comparing the areas 85 in FIG. 1(*a*) and FIG. 2(*a*). Moreover, the area 83 is reduced, in which the edge of the track forming pattern 41 and the edge of the stripe-height forming pattern 71 are not protected by the insulating film. Therefore, a drop of the insulation voltage and generation of short-circuits at the edge of the track forming pattern 41 and the edge of the stripe-height forming pattern 71 can be reduced compared to the prior art.

Since the above-mentioned effect is caused by bringing the protection area of the insulating film 10 close to the CPP film 3, it is not necessary to think about thickening the insulating film 2 and bringing the area protected by the insulating film 2 close to the CPP film 3. On the other hand, it becomes possible to separate the area protected by the insulating film 2 from the CPP film 3. Therefore, reducing the effect of steps of the insulating film 2 becomes possible, so that improving the film thickness distribution of the photoresist and a reduction of halation can be planned. As a result, improving the measurement accuracy of the track forming pattern 41 and the stripe-height forming pattern 71 become possible. Therefore, compatibility of narrow track width and narrow gap length with improvements in the insulation voltage yield and high frequency characteristics, etc. becomes possible.

Figure 3:
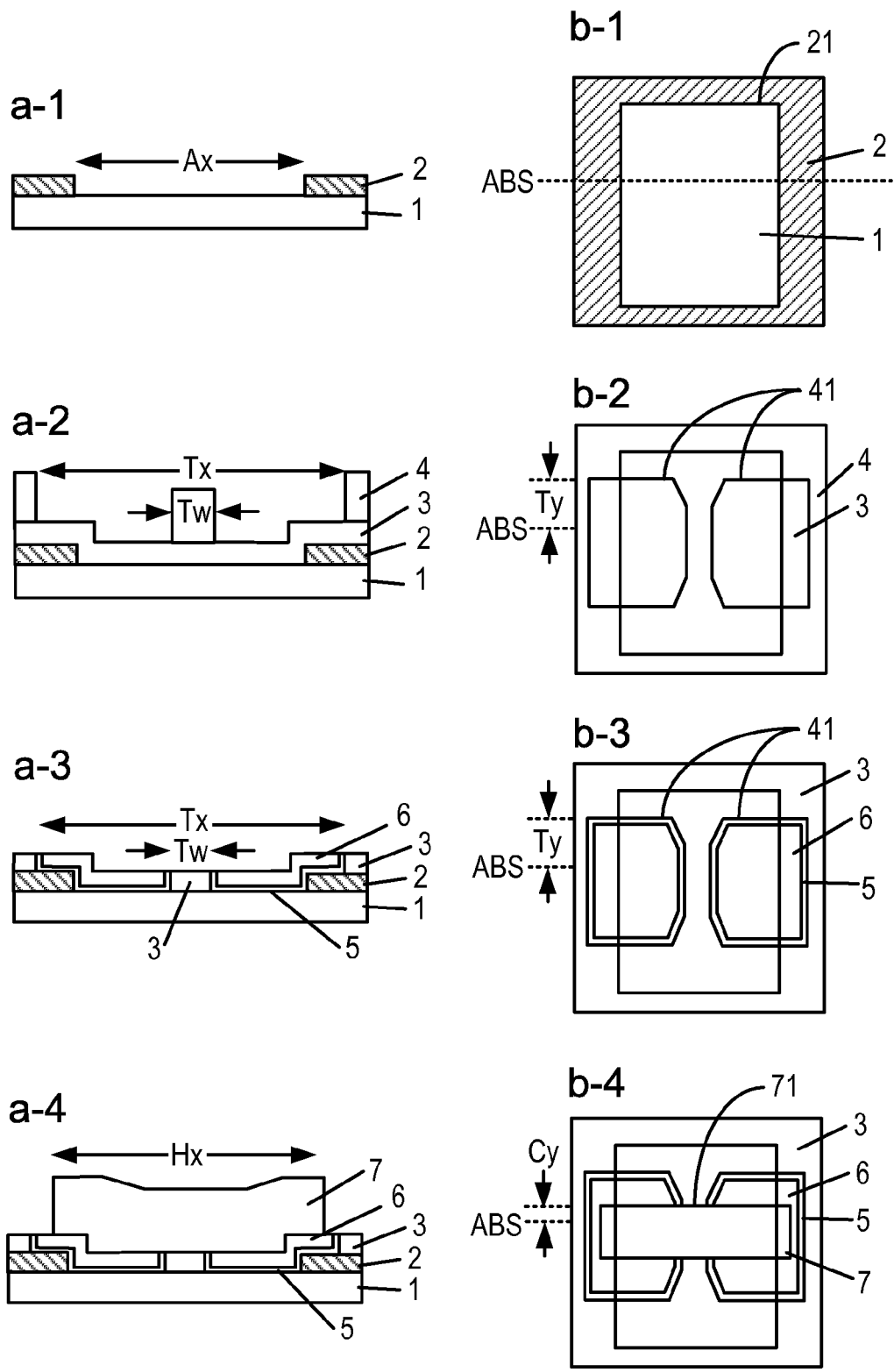
FIG. 3 is a fabrication process chart of a thin film magnetic head shown in FIG. 1.
Figure 4:
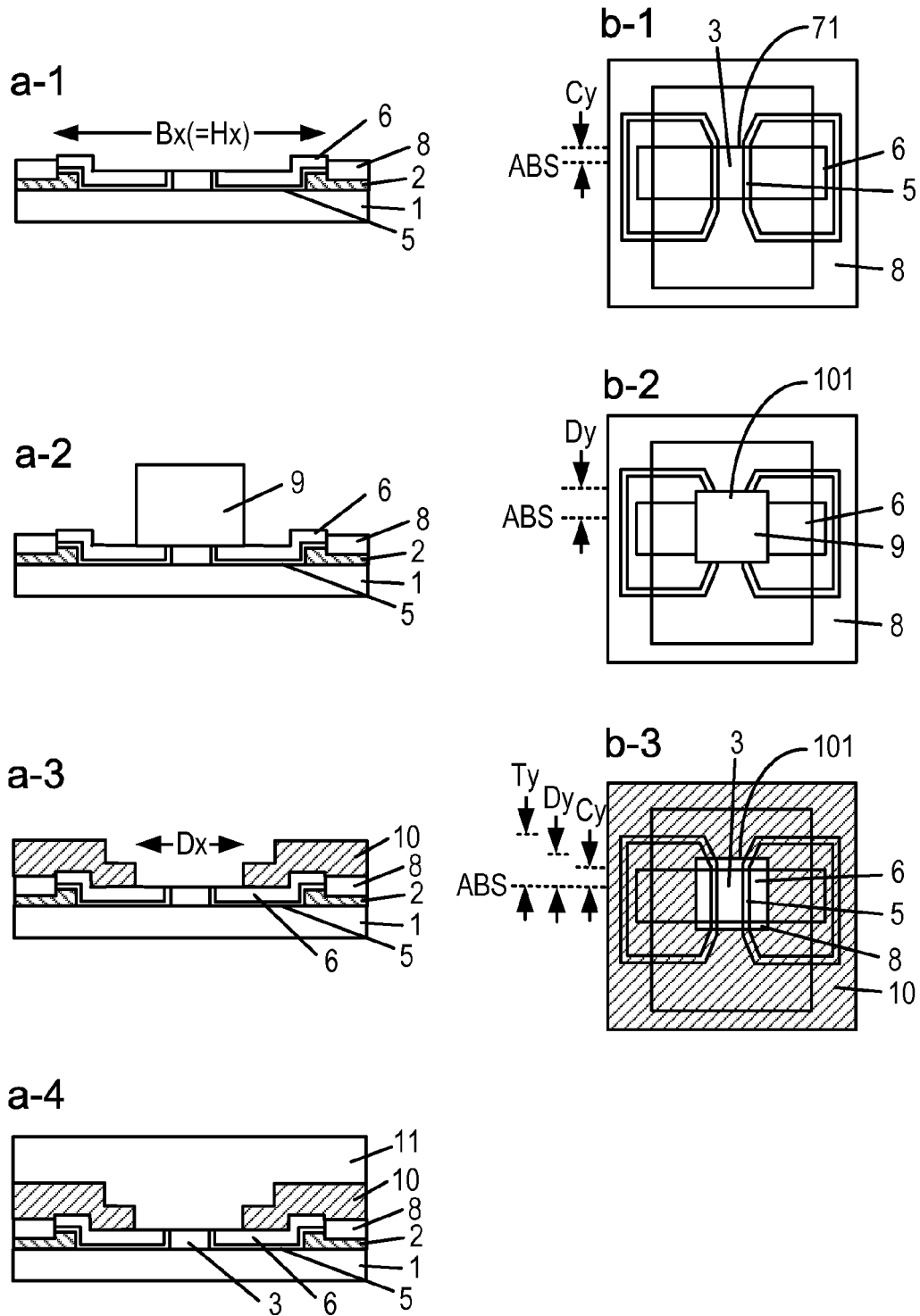
FIG. 4 is a fabrication process chart of a thin film magnetic head shown in FIG. 1.

FIG. 3 and FIG. 4 show one example of a thin film magnetic head of the present invention. This is a fabrication process of a thin film magnetic head shown in FIG. 1. The figures seen from the air bearing surface are shown in FIG. 3(*a*-1) to FIG. 3(*a*-4) and FIG. 4(*a*-1) to FIG. 4(*a*-4), and each plan projection drawing is shown in FIG. 3(*b*-1) to FIG. 3(*b*-4) and FIG. 4(*b*-1) FIG. 4(*b*-3).

As shown in FIG. 3(*a*-1) and FIG. 3(*b*-1), the lower shield 1 is formed from the substrate (not shown in the figure) and the insulating film 2 is formed thereon. The insulating film 2 has an opening, and the distance on the air bearing surface is Ax. As shown in FIG. 3(*b*-1), the opening of the insulating film 2 has the shape 21.

Next, as shown in FIG. 3(*a*-2) and FIG. 3(*b*-2), the CPP film 3 is deposited. After that, the track forming resist-pattern 4 is formed by a photolithography process. The distance between the outside edges of the track forming resist pattern 4 and the width of the track forming resist pattern 4 at the center part are assumed to be Tx and Tw, respectively. As clearly shown in FIG. 3(*b*-2), the track forming resist pattern 4 has two openings and it has the opening shape 41. The pattern length along the depth direction from the ABS of the opening shape 41 of the track forming resist pattern 4 is Ty.

Next, as shown in FIG. 3(*a*-3) and FIG. 3(*b*-3), the CPP film 3 is etched by using the track forming resist pattern 4 as an etching mask. Moreover, the insulating film 5 and the domain control film 6 (or sub-shield film) are deposited leaving the track forming resist pattern 4, and then the track forming resist pattern 4 is removed. According to this step, the shape of the track forming resist pattern 41 is transferred to the CPP film 3, the insulating film 5, and the domain control film 6(or sub-shield film). As shown in FIG. 3(*b*-3), the pattern length Ty along the depth direction from the ABS of the opening shape 41 is also the pattern length along the depth direction from the ABS of the insulating film 5.

Next, as shown in FIG. 3(*a*-4) and FIG. 3(*b*-4), the stripe-height forming resist-pattern 7 is formed by using a photolithography process. The width of the stripe-height forming resist-pattern 7 is assumed to be Hx. The outside of the (*b*-4) stripe-height forming resist-pattern 7 has the shape 71 shown in FIG. 3(*b*-4). The pattern length along the depth direction from the ABS of the stripe-height forming resist-pattern 7 is Cy.

Next, as shown in FIG. 4(*a*-1) and FIG. 4(*b*-1), the CPP film 3, the insulating film 5, and the domain control film 6 (or sub-shield film) are etched by using the stripe-height forming resist pattern 7. Moreover, the insulating film 8 is deposited leaving the stripe-height forming resist pattern 7, and then the stripe-height forming resist pattern 7 is removed. According to this step, the stripe-height forming resist pattern 7 is transferred to the CPP film 3, the insulating film 5, and the domain control film 6 (or sub-shield film). When the distance between the outside edges of the insulating film 5 is assumed to be Bx; this Bx is almost the same as the width of the stripe-height forming pattern 7, Hx, because, as mentioned above, the insulating film 5 was etched by using the stripe-height forming resist pattern 7 as an etching mask. Moreover, the film thickness of the insulating film 2 is reduced by over-etching which occurred while etching. A step formed at this time is reduced by depositing the insulating film 8 after that, and it is possible to reduce the step by thickening the insulating film 8. However, in the case when decreasing the step is planned by thickening the insulating film 8, there is concern that removing the stripe-height resist pattern 7 after that becomes difficult. As shown in FIG. 4(*b*-1), the pattern length along the depth direction from the ABS of the CCPP film 3 is Cy, because, as mentioned above, the CCPP film 3 was etched by using the stripe-height forming resist pattern 7 as an etching mask.

Next, as shown in FIG. 4(*a*-2) and FIG. 4(*b*-2), the resist pattern 9 is prepared for forming the insulating film 10. The pattern length along the depth direction from the ABS of the resist pattern 9 is Dy.

After that, as shown in FIG. 4(*a*-3) and FIG. 4(*b*-3), the insulating film 10 is deposited and the resist pattern 9 is removed. Then, the insulating film 10 is formed in which the opening shape 101 has the distance Dx. The distance Dx of the insulating film 10 is almost the same as the width of the resist pattern 9. This resist pattern 9 is not necessary to have a measurement accuracy the same as that of the aforementioned track forming resist pattern 4 and the stripe-height forming resist pattern 7. Therefore, it is possible for the resist pattern 9 to thicken the resist film thickness, so that it can be easily removed even when the insulating film 10 becomes thicker. As shown in FIG. 4(*b*-3), the pattern length along the depth direction from the ABS of the opening shape 101 of the insulating film 10 is almost the same as Dy. It is important that the relationship of these pattern dimensions has a relationship being Cy<Dy<Ty as shown in the figure.

Next, as shown in FIG. 4(*a*-4), the thin film magnetic head shown in the embodiment in FIG. 1 is fabricated by forming the upper shield 11. The relationship of the pattern dimensions has a relationship being Tw<Dx<Ax<Bx. The more important thing in this step is having a relationship being Tw<Dx<Bx. Therefore the effect of the present invention is obtained. Moreover, in this fabrication process, the track direction is processed before processing the stripe-height direction. Therefore, the track forming resist pattern 4 providing Tw is only affected by the step of the insulating film 2, and it is possible to limit degradation of the measurement accuracy caused by the influence of steps to a minimum.

Figure 5:
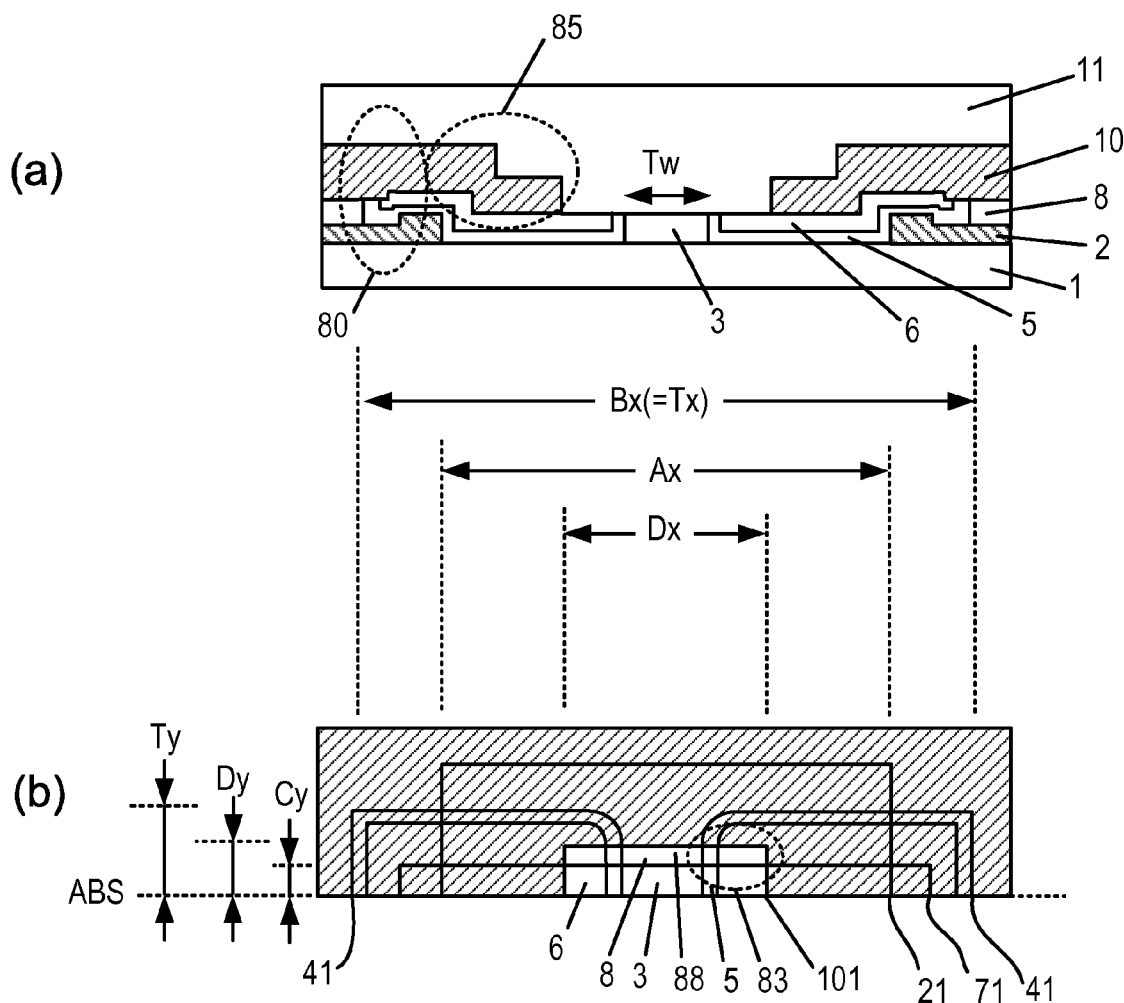
FIG. 5 is a schematic drawing illustrating another embodiment of a thin film magnetic head according to the present invention.

FIG. 5 is a schematic drawing illustrating another embodiment of a thin film magnetic head according to the present invention. FIG. 5(*a*) is a drawing as seen from the air bearing surface and FIG. 5(*b*) is a plane projection drawing.

In the case when a thin film magnetic head of the present embodiment is seen from the air bearing surface, the point shown as Bx=Tx in FIG. 5(*a*) is different from the head of the embodiment shown in FIG. 1. It is also different in the plan projection drawing. For example, the film configuration is different in the case focusing on the area 83. The insulating film 8 is placed at the area 83 shown in FIG. 1(*b*). However, the insulating film 5 and the domain control film 6 (or sub-shield film) are placed in FIG. 5(*b*). Even in this case, the effect of the present invention is achieved because it has the relationship being Tw<Dx<Ax<Bx and has the more important relationship being Tw<Dx<Bx. Moreover, it also has the relationship being Cy<Dy<Ty.

Figure 6:
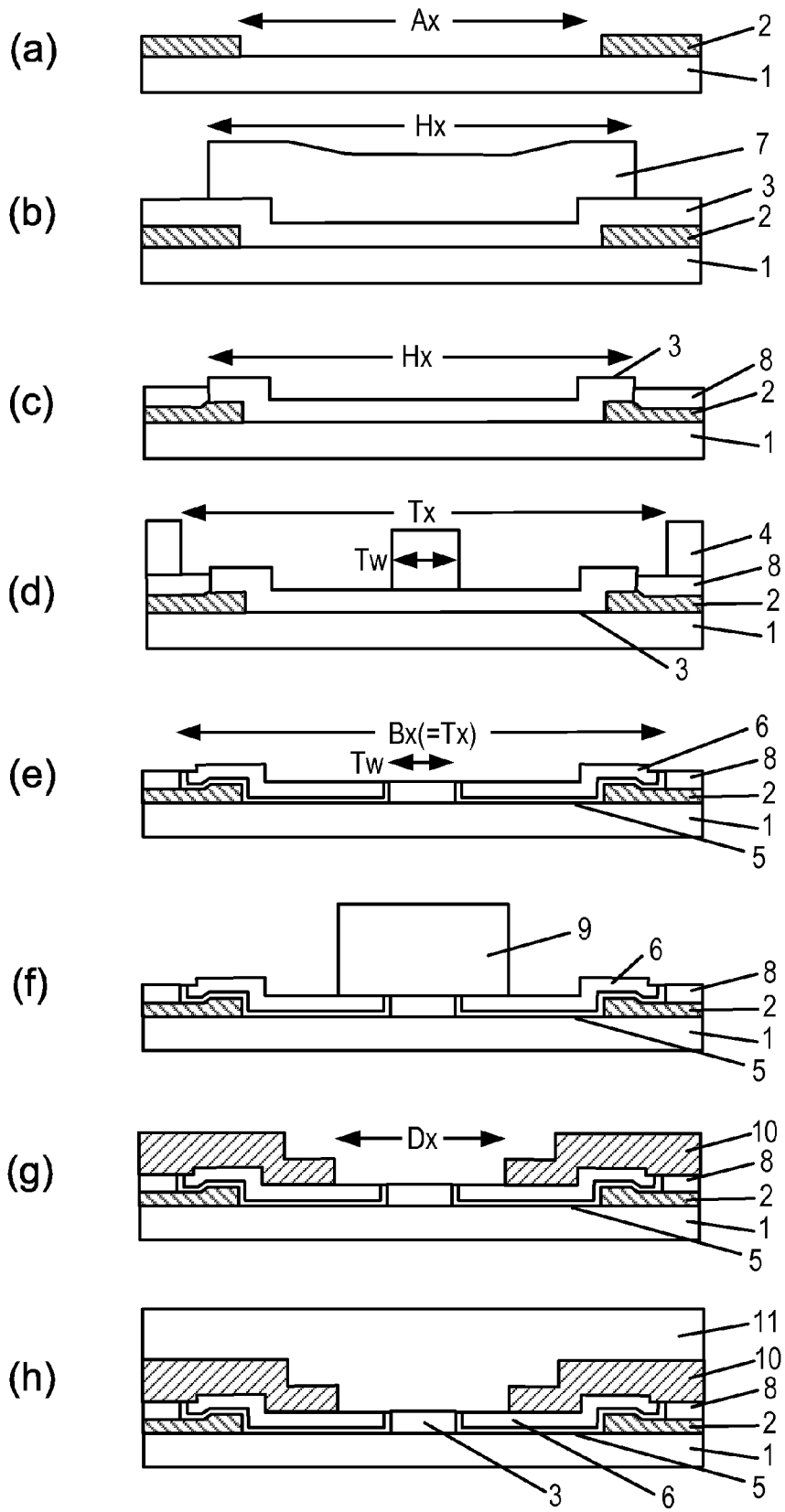
FIG. 6 is a fabrication process chart of a thin film magnetic head shown in FIG. 5.

FIG. 6 is a drawing illustrating an example of a fabrication process of the thin film magnetic head shown in FIG. 5, and it is a drawing as seen from the air bearing surface.

First of all, as shown in FIG. 6(*a*), the lower shield 1 is formed from the substrate (not shown in the figure) and the insulating film 2 is formed thereon. The insulating film 2 has an opening and the distance on the air bearing surface is Ax. Next, as shown in FIG. 6(*b*), the CPP film 3 is deposited. After that, the stripe-height forming resist pattern 7 is formed by a photolithography process. The width of the stripe-height forming resist pattern 7 is assumed to be Hx. Next, as shown in FIG. 6(*c*), the CPP film 3 is etched by using the stripe-height forming resist pattern 7 as an etching mask. Moreover, the insulating film 8 is deposited leaving the stripe-height forming resist pattern 7, and then the stripe-height forming resist pattern 7 is removed. Moreover, the film thickness of the insulating film 2 is reduced by over-etching which occurs while etching. A step formed at this time is reduced by depositing the insulating film 8 after that, and it is possible to reduce the step by thickening the insulating film 8. However, in the case when decreasing the step is planned by thickening the insulating film 8, there is concern that removing the stripe-height resist pattern after that becomes difficult.

Next, as shown in FIG. 6(*d*), the track forming resist pattern 4 is formed by using a photolithography process. The distance between the outside edges of the track resist forming pattern 4 is assumed to be Tx, and the width of the track forming resist pattern 4 at the center part is assumed to be Tw. Next, as shown in FIG. 6(*e*), the CPP film 3 and the insulating film 8 are etched by using the track forming resist pattern 4 as an etching mask. Moreover, the insulating film 5 and the domain control film 6 (or sub-shield film) are deposited leaving the track forming resist pattern 4, and then the track forming resist pattern 4 is removed. According to this step, the shape of the track forming resist pattern 4 is transferred to the CPP film 3, the insulating film 5, and the domain control film 6 (or sub-shield film). When the distance between the outside edges of the insulating film 5 is assumed to be Bx, this Bx is almost the same as the distance between the outside edges of the track forming resist pattern 4, Tx, because, as mentioned above, the CPP film 3 and the insulating film 8 were etched by using the track forming resist pattern 4 as an etching mask.

Next, as shown in FIG. 6(*f*), the resist pattern 9 is prepared for forming the insulating film 10. After that, as shown in FIG. 6(*g*), the insulating film 10 is deposited and the resist pattern 9 is removed. Then, the insulating film 10 with the distance Dx is formed. The distance Dx of the insulating film 10 is almost the same as the width of the resist pattern 9. It is not necessary that this resist pattern 9 has a measurement accuracy the same as that of the aforementioned track forming resist pattern 4 and the stripe-height forming resist pattern 7. Therefore, it is possible for the resist pattern 9 to thicken the resist film thickness, so that it can be easily removed even if the insulating film 10 becomes thicker. At the end, as shown in FIG. 6(*h*), the upper shield 11 is formed, and fabrication of the thin film magnetic head shown in FIG. 5 is completed. The relationship of these pattern dimensions has a relationship being Tw<Dx<Ax<Bx. The more important thing herein is having a relationship being Tw<Dx<Bx.

The fabrication process shown in FIG. 6 is different from the fabrication process described referring to FIG. 3 and FIG. 4, and the track direction is processed after processing the stripe-height direction. That is, there are some parts where the order of the steps in FIG. 6 is opposite from the order of the steps shown in FIG. 3 and FIG. 4. However, the effect of the present invention is performed as described above. Moreover, since the track direction is processed before processing the stripe-height direction in the fabrication process of the present embodiment, the stripe-height forming resist pattern 7 providing the stripe-height direction is only affected by the step of the insulating film 2, and it is possible to limit degradation of the measurement accuracy caused by the influence of steps to a minimum.

Figure 7:
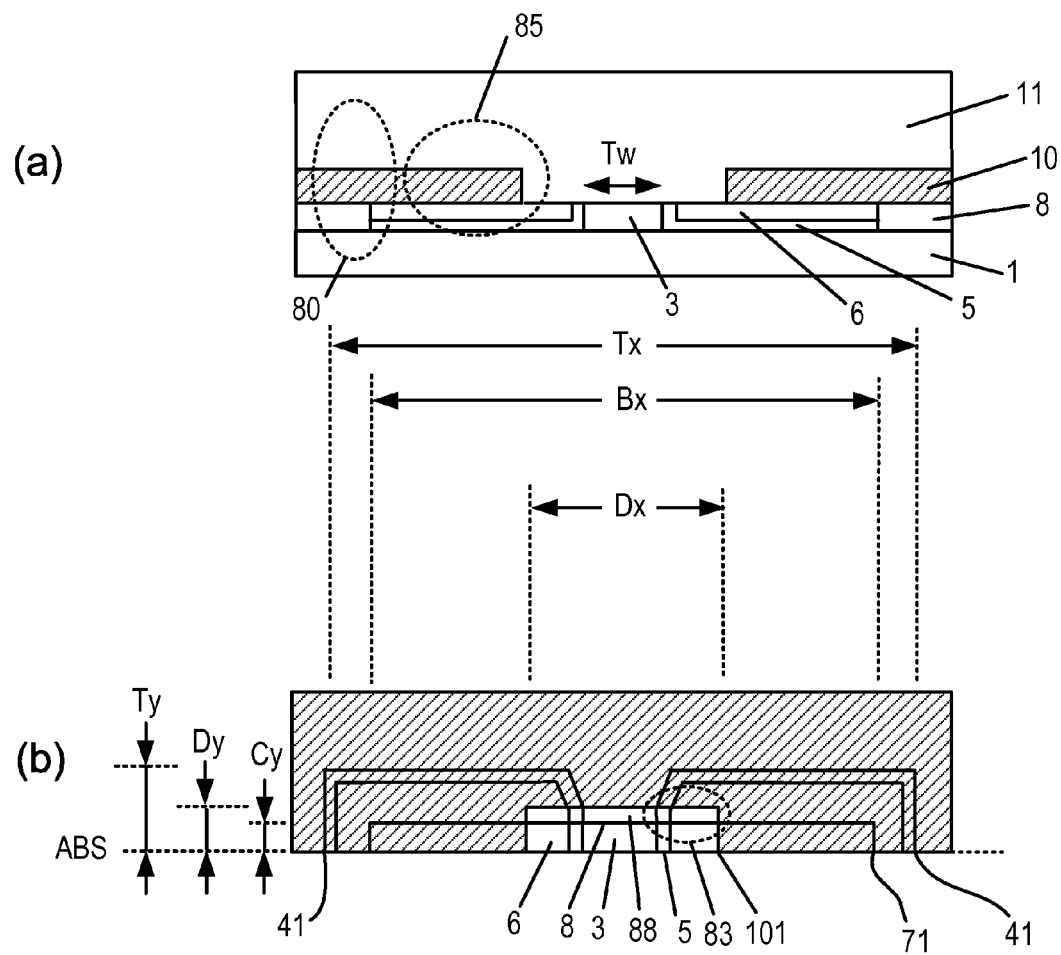
FIG. 7 is a schematic drawing illustrating another embodiment of a thin film magnetic head according to the present invention.

FIG. 7 is a schematic drawing illustrating another embodiment of a thin film magnetic head according to the present invention. FIG. 7(*a*) is a drawing as seen from the air bearing surface, and FIG. 7(*b*) is a plane projection drawing. This embodiment is an example when the insulating layer 2 is omitted. A further improvement effect in this embodiment is that the step is reduced because of omitting the insulating film 2, and the measurement accuracy of the track forming resist pattern 4 and the stripe-height forming resist pattern 7 is improved.

FIG. 7 is an example when the track formation is processed first, but the same effect will be obtained even if the stripe-height forming is processed first as shown in the following FIG. 9.

Figure 8:
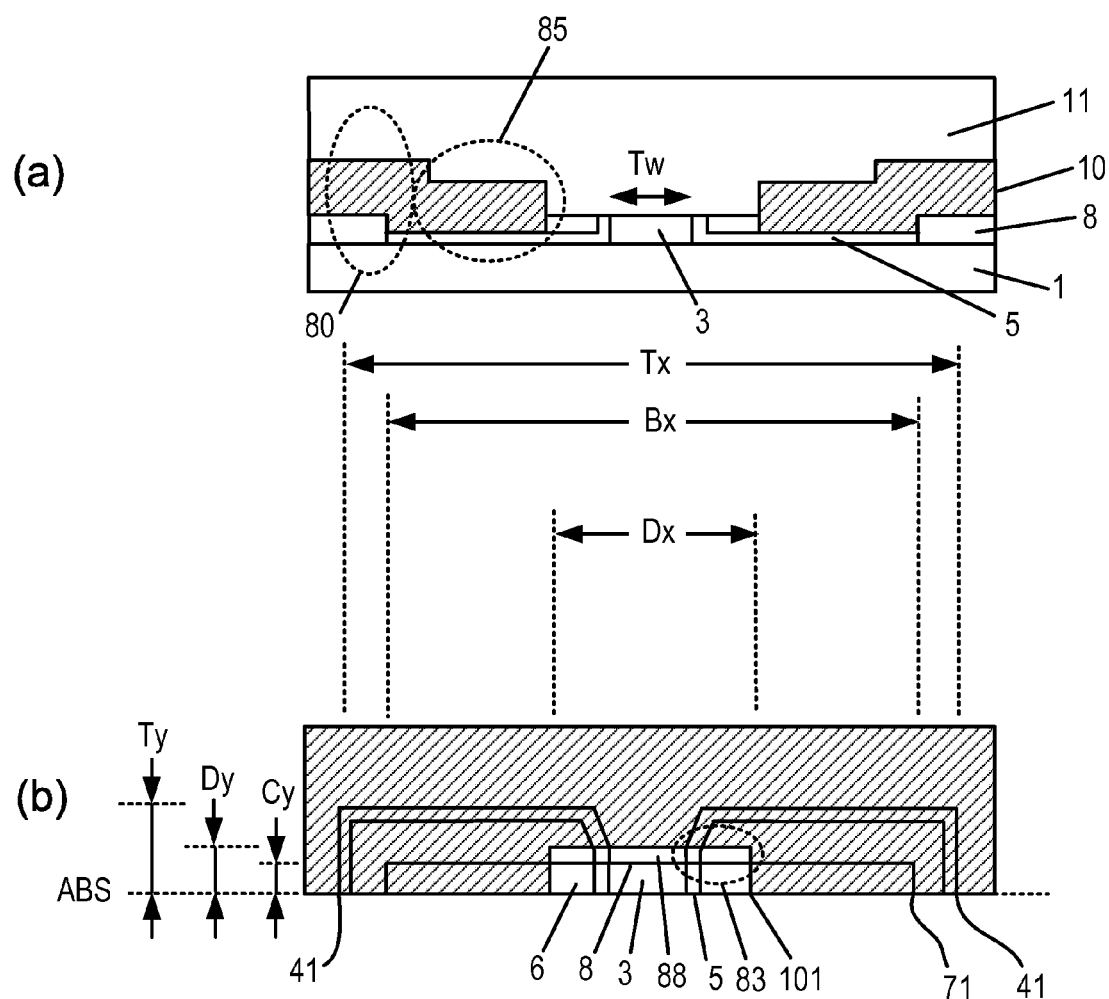
FIG. 8 is a schematic drawing illustrating another embodiment of a thin film magnetic head according to the present invention.

FIG. 8 is a schematic drawing illustrating another embodiment of a thin film magnetic head according to the present invention. FIG. 8(a) is a drawing as seen from the air bearing surface and FIG. 8(b) is a plane projection drawing.

This embodiment is an example when the insulating layer 2 and the sub-shield film 6 are omitted. This structure is the one in which the upper shield 11 also has the function of the sub-shield film 6, and the function of the domain control is given in the CPP film 3. A further improvement effect in this embodiment is that there is no discontinuity observed at the interface between the sub-shield film 6 and the upper shield 11, because it does not have the sub-shield film 6, so that the shielding effect is stably performed magnetically.

Figure 9:
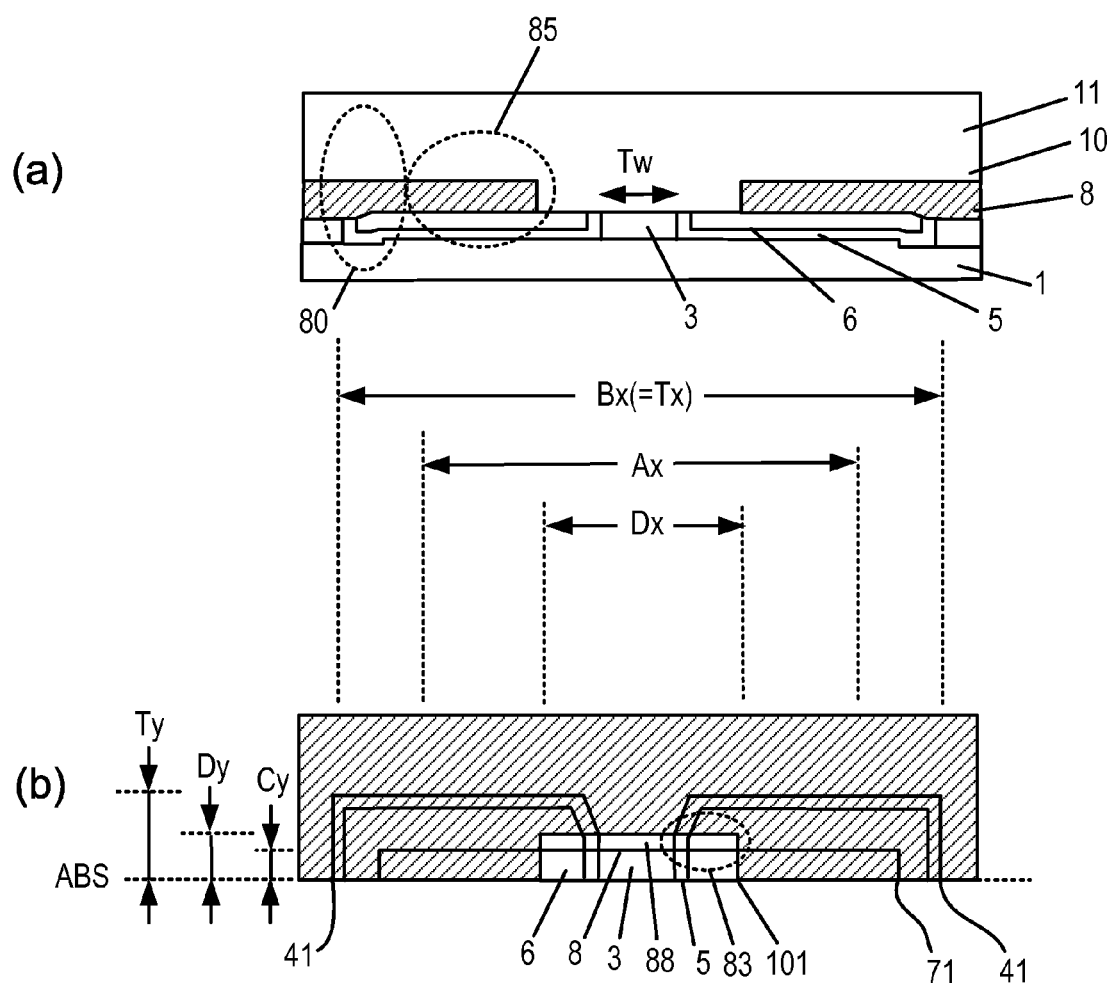
FIG. 9 is a schematic drawing illustrating another embodiment of a thin film magnetic head according to the present invention.

FIG. 9 is a schematic drawing illustrating another embodiment of a thin film magnetic head according to the present invention. FIG. 9(a) is a drawing as seen from the air bearing surface and FIG. 9(b) is a plane projection drawing.

This embodiment is an example when the insulating layer 2 is omitted in FIG. 5. A further improvement effect in this embodiment is that the step is reduced because of omitting the insulating film 2, and the measurement accuracy of the stripe-height forming resist pattern 7 is improved. Moreover, because the step is reduced by omitting the insulating film 2, there is an effect of improving the measurement accuracy of the track forming resist pattern 4 prepared later.

Figure 10:
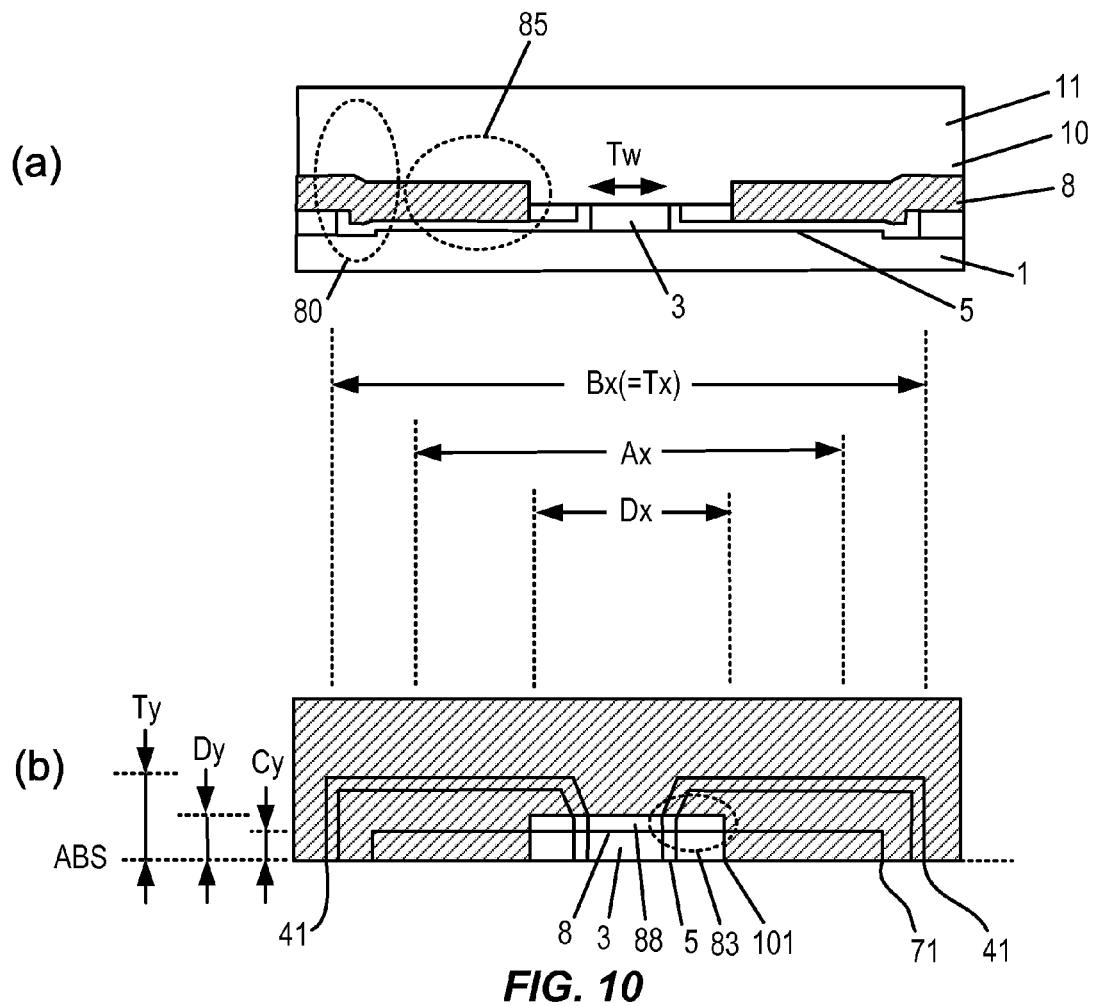
FIG. 10 is a schematic drawing illustrating another embodiment of a thin film magnetic head according to the present invention.

FIG. 10 is a schematic drawing illustrating another embodiment of a thin film magnetic head according to the present invention. FIG. 10(a) is a drawing as seen from the air bearing surface and FIG. 10(b) is a plane projection drawing. This embodiment is an example when the insulating layer 2 and the sub-shield film 6 are omitted in FIG. 5. This structure is the one in which the upper shield 11 is also used for the function of the sub-shield film 6, and the function of the domain control is given in the CPP film 3. A further improvement effect in this embodiment is that there is no discontinuity observed at the interface between the sub-shield film 6 and the upper shield 11, because it does not have the sub-shield film 6, so that the shielding effect is stably performed magnetically.

Figure 11:
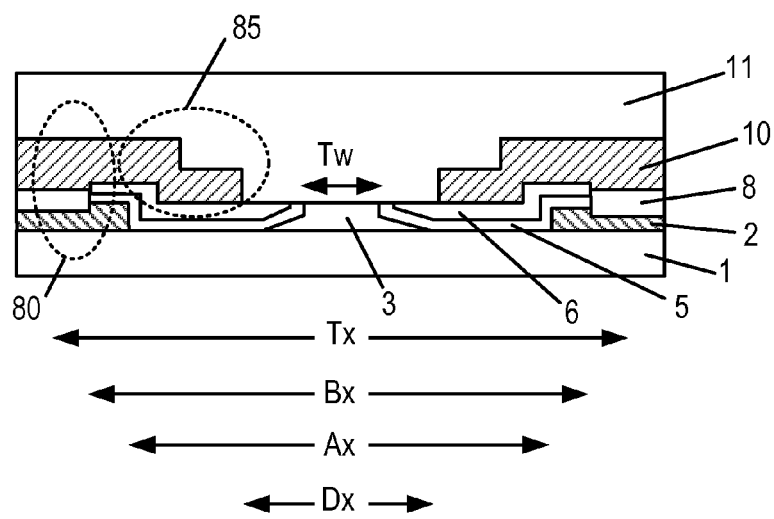
FIG. 11 is a schematic drawing illustrating another embodiment of a thin film magnetic head according to the present invention.

FIG. 11 is a schematic drawing illustrating another embodiment of a thin film magnetic head according to the present invention. This embodiment is the one which has a structure having tapers in the CPP film 3 of FIG. 1(a). A further improvement effect in this embodiment is that it becomes possible to increase the cross-sectional area for the current flowing direction, resulting in the electrical resistivity decreasing. Moreover, in the case when the taper parts of the CPP film have an anti-ferromagnetic layer, the stabilization of the characteristics of the anti-ferromagnetic layer is increased because the characteristics of the anti-ferromagnetic layer become more stable with increasing the volume. That is, it becomes possible to obtain low resistance and stabilization of the characteristics of the device.

Figure 12:
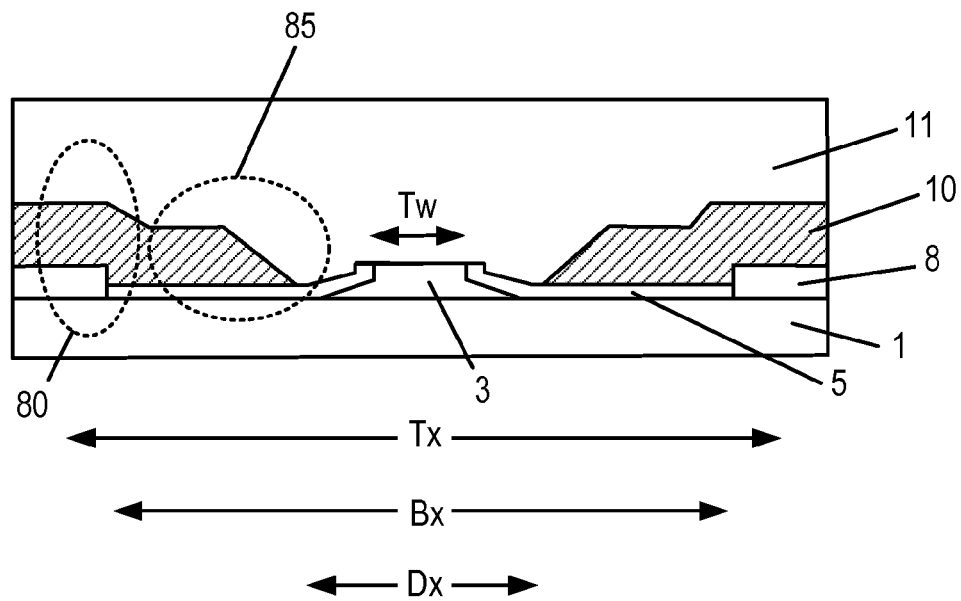
FIG. 12 is a schematic drawing illustrating another embodiment of a thin film magnetic head according to the present invention.

FIG. 12 is a schematic drawing illustrating another embodiment of a thin film magnetic head according to the present invention. This embodiment is the one which has a structure having tapers in the CPP film 3 of FIG. 8(a). Additionally, it is a structure in which the insulating film 10 also has tapers. A further improvement effect in this embodiment is the same as the embodiment shown in FIG. 11, and it becomes possible to increase the cross-sectional area for the current flowing direction, resulting in the electrical resistivity decreasing.

Moreover, in the case when the taper parts of the CPP film have an anti-ferromagnetic layer, the stabilization of the characteristics of the anti-ferromagnetic layer is increased because the characteristics of the anti-ferromagnetic layer become more stable with increasing the volume. That is, it becomes possible to obtain low resistance and stabilization of the characteristics of the device. Moreover, the upper shield 11 can decrease the magnetic domain wall created at the edges of the insulating film 10 etc. by making the insulating film 10 a taper shape.

Figure 13:
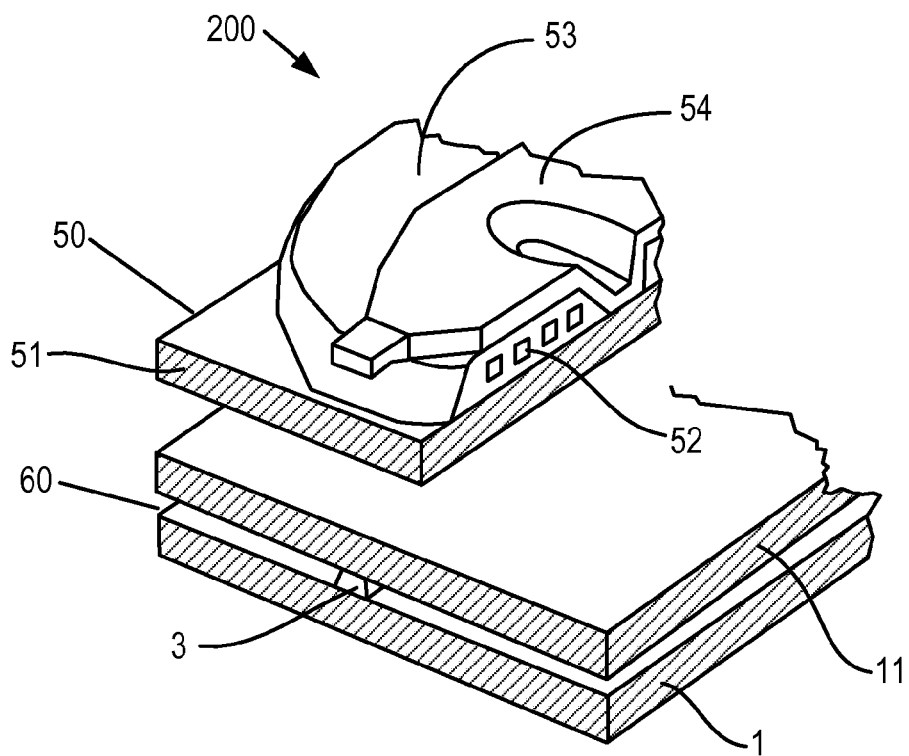
FIG. 13 is a schematic drawing illustrating an embodiment of a magnetic head according to the present invention.

FIG. 13 is a schematic drawing illustrating another embodiment of a thin film magnetic head according to the present invention. The magnetic head 200 shown in the embodiment consists of a read head 60 and a write head 50. The write head 50 is a single-pole head corresponding to perpendicular recording, and it consists of a sub-magnetic pole 51, a coil 52, a coil insulating layer 53, and a main pole 54. A write head for longitudinal recording can be used for the write head. The read head 60 is a thin film magnetic head, which has been explained in the aforementioned embodiment, and only the lower shield 1, the CPP film 3, and the upper magnetic pole 11 are shown. The other component parts are omitted in the figure. The magnetic head of this embodiment has the effects being explained above, whereby it maintains the insulation voltage between the upper and lower leads and prevents short circuit failure, resulting in the yield being improved. Moreover, the capacitance is reduced by decreasing the narrow gap area between the upper and lower leads in the read head, resulting in the frequency characteristics improving.

Figure 14:
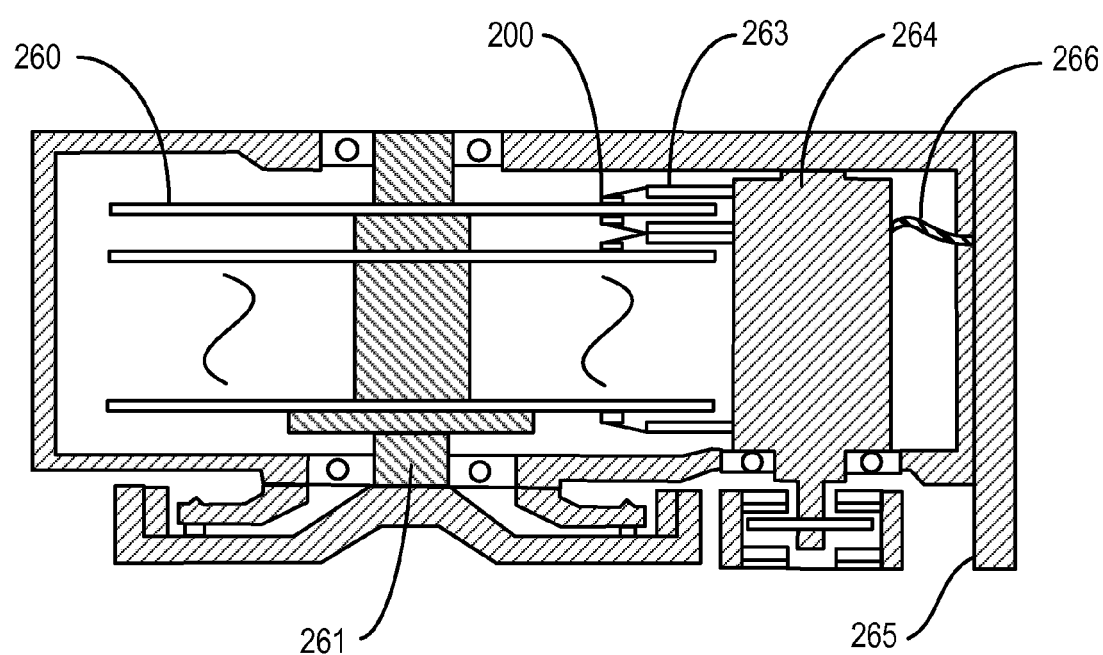
FIG. 14 is a schematic drawing illustrating a magnetic disc storage on which a magnetic head of the present invention is mounted.

FIG. 14 is a schematic drawing illustrating a magnetic disc storage in which a magnetic head of the present invention is mounted. This magnetic disc storage comprises the disk 260 rotated by the spindle motor 261 and the magnetic head 200 in which information is recorded or reproduced by positioning at the desired track of the disk 260. A magnetic head of the present invention shown in FIG. 13 is mounted in the magnetic head 200. The magnetic head 200 is supported by the gimbal 263 and positioned on the track of the disk by an actuator such as the voice coil motor 264, etc.

The magnetic head 200 is connected to the signal processing circuit 265 through the wire 266, and the recording signal field from the write head and the reproduction signal field from the read head are processed in the signal processing circuit 265. A thin film magnetic head of the present invention is mounted on the magnetic head 200 as a read head, whereby the recording density is improved and the signal processing speed is improved compared with a conventional magnetic disc storage.

The contents of the present invention have been concretely described referring to several embodiments, and it is clear that various modifications can be obtained based on fundamental technical ideas except for the embodiments described above.

Although the details of the film configuration of the sensor film 3 were not described, the effects of the present invention are not changed even if any kind of film configuration such as GMR, TMR, and others is used as the sensor film 3, as long as it is a structure allowing the detected current to flow in a direction perpendicular to the sensor film. Shapes, in which the sensor film 3 is exposed to the air bearing surface as is, have been described above. However, even in cases when a part of the sensor film 3 is arranged to be exposed and the sensor film 3 is not exposed to the air bearing surface, similar effects can be exhibited by having the relationship of the depth direction from the track direction and the air bearing surface the same as the relationship of the present invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A thin film magnetic head, comprising:
    a sensor film;
    a mechanism to allow an electric current flow along the film thickness direction;
    an upper shield and a lower shield;
    a first insulating film provided at both ends in a track direction of said sensor film on an air bearing surface side with at least one part connected to a track direction wall surface of said sensor film; and
    a second insulating film formed between said upper shield and said first insulating film;
    wherein the relationship $Tw<Dx<Bx$ holds in which Tw is a distance between edges of said first insulating film connected to said track direction wall surface of said sensor film, Bx is a distance between outside edges of said first insulating film along the track direction, and Dx is a distance between inside edges of said second insulating film along the track direction;
    wherein a pattern providing said Tw, a pattern providing a length along a depth direction from an air bearing surface of said sensor film, and a pattern providing a length along the depth direction from an air bearing surface of said second insulating film are additionally included; and
    a relationship $Cy<Dy<Ty$ holds in which Ty is the length of the pattern providing said Tw along the depth direction from an air bearing surface, Cy is the length of the pattern along the depth direction providing the length of depth direction from an air bearing surface of said sensor film, and Dy is the length of the pattern along the depth direction from an air bearing surface providing the length of depth direction from an air bearing surface of said second insulating film.

2. A thin film magnetic head as in claim 1, wherein a magnetic film is formed between said first insulating film and said second insulating film.

3. A thin film magnetic head as in claim 2, wherein said magnetic film contains a hard magnetic film or a soft magnetic film.

4. A thin film magnetic head, comprising:
    a sensor film;
    a mechanism to allow an electric current flow along the film thickness direction;
    an upper shield and a lower shield;
    a first insulating film provided at both ends in a track direction of said sensor film on an air bearing surface side with at least one part connected to a track direction wall surface of said sensor film;
    a second insulating film formed between edges of said first insulating film along the track direction and the lower shield; and
    a third insulating layer formed between said upper shield and said first insulating film,
    wherein the relationship $Tw<Dx<Ax<Bx$ holds in which Tw is a distance between edges of said first insulating film connected to said track direction wall surface of said sensor film, Bx is a distance between outside edges of said first insulating film along the track direction, Ax is a distance between inside edges of said second insulating film along the track direction, and Dx is a distance between inside edges of said third insulating film along the track direction.

5. A thin film magnetic head as in claim 4, wherein a pattern providing said Tw, a pattern providing a length along a depth direction from an air bearing surface of said sensor film, and a pattern providing a length along the depth direction from an air bearing surface of said third insulating film are additionally included; and
    a relationship $Cy<Dy<Ty$ holds in which Ty is the length of the pattern providing said Tw along the depth direction from an air bearing surface, Cy is the length of the pattern along the depth direction providing the length of depth direction from an air bearing surface of said sensor film, and Dy is the length of the pattern along the depth direction from an air bearing surface providing the length of the depth direction from an air bearing surface of said third insulating film.

6. A thin film magnetic head as in claim 4, wherein a magnetic film is formed between said first insulating film and said third insulating film.

7. A thin film magnetic head as in claim 6, wherein said magnetic film contains a hard magnetic film or a soft magnetic film.

* * * * *

UNITED STATES PATENT AND TRADEMARK OFFICE
CERTIFICATE OF CORRECTION

PATENT NO. : 7,522,387 B2  Page 1 of 1
APPLICATION NO. : 11/183037
DATED : April 21, 2009
INVENTOR(S) : Yoshida It is certified that error appears in the above-identified patent and that said Letters Patent is hereby corrected as shown below:

Title Pg. Item (57) Abstract

Line 3 of the abstract, after "In one embodiment," please delete word "die".

Signed and Sealed this

Twenty-third Day of June, 2009

JOHN DOLL
*Acting Director of the United States Patent and Trademark Office*